(12) United States Patent
Wahls et al.

(10) Patent No.: US 7,703,852 B2
(45) Date of Patent: Apr. 27, 2010

(54) HEAVY DUTY RECLINING MECHANISM FOR VEHICLE SEATS

(75) Inventors: Robert Wahls, Commerce Township, MI (US); James S. Wawrzyniak, Warren, MI (US)

(73) Assignee: Lear Corporation, Southfield, MI (US)

( * ) Notice: Subject to any disclaimer, the term of this patent is extended or adjusted under 35 U.S.C. 154(b) by 240 days.

(21) Appl. No.: 11/949,285

(22) Filed: Dec. 3, 2007

(65) Prior Publication Data

US 2009/0140565 A1 Jun. 4, 2009

(51) Int. Cl.
*B60N 2/02* (2006.01)
(52) U.S. Cl. .................................................. 297/367
(58) Field of Classification Search .................. 297/367
See application file for complete search history.

(56) References Cited

U.S. PATENT DOCUMENTS

| | | | |
|---|---|---|---|
| 5,622,407 A | 4/1997 | Yamada et al. | |
| 5,779,313 A | 7/1998 | Rohee | |
| 6,007,153 A * | 12/1999 | Benoit et al. | 297/378.12 |
| 6,092,874 A | 7/2000 | Kojima et al. | |
| 6,095,608 A * | 8/2000 | Ganot et al. | 297/367 R |
| 6,112,370 A | 9/2000 | Blanchard et al. | |
| 6,312,053 B1 | 11/2001 | Magyar | |
| 6,328,383 B2 | 12/2001 | Rohee et al. | |
| 6,454,354 B1 | 9/2002 | Vossmann et al. | |
| 6,474,740 B1 | 11/2002 | Kondo et al. | |
| 6,648,414 B2 | 11/2003 | Ikegaya et al. | |
| 6,669,297 B2 | 12/2003 | Cilliere et al. | |
| 6,742,844 B2 | 6/2004 | Pollack | |
| 6,769,740 B2 | 8/2004 | Yamada | |
| 6,883,869 B2 | 4/2005 | Liu et al. | |
| 6,890,034 B2 | 5/2005 | Bonk | |
| 6,910,738 B2 | 6/2005 | Bonk | |
| 6,923,504 B1 | 8/2005 | Liu et al. | |
| 6,991,294 B2 | 1/2006 | Choi | |
| 6,991,295 B2 | 1/2006 | Peters | |
| 7,093,902 B2 | 8/2006 | Lehmann et al. | |
| 7,100,986 B2 * | 9/2006 | Uramichi et al. | 297/366 |
| 7,100,987 B2 | 9/2006 | Volker et al. | |
| 7,204,555 B2 | 4/2007 | Thiel | |
| 7,261,379 B2 | 8/2007 | Volker et al. | |
| 7,380,883 B2 * | 6/2008 | Koumura | 297/367 R |
| 7,404,604 B2 * | 7/2008 | Nag et al. | 297/367 R |
| 7,407,230 B1 * | 8/2008 | Luo et al. | 297/367 R |
| 7,563,049 B2 * | 7/2009 | Peters | 403/97 |
| 2002/0096925 A1 * | 7/2002 | Uramichi | 297/367 |
| 2002/0171280 A1 * | 11/2002 | Okazaki et al. | 297/367 |
| 2003/0230923 A1 * | 12/2003 | Uramichi | 297/367 |
| 2004/0036337 A1 * | 2/2004 | Hoshihara et al. | 297/367 |
| 2004/0036338 A1 * | 2/2004 | Lardais et al. | 297/367 |

(Continued)

*Primary Examiner*—Laurie K Cranmer
(74) *Attorney, Agent, or Firm*—Brooks Kushman P.C.

(57) ABSTRACT

A manual vehicle seat reclining mechanism and seat assembly incorporating the reclining mechanism is disclosed. A guide plate and a pivotal plate are assembled together and disposed between the seat base and seat back. A cam is biased by a spring to hold locking elements in engagement with the pivotal plate. A control plate is manually rotated with the cam to release the locking elements by drawing pins on one side of the locking plates radially inwardly with slots provided in the control plate. Ribs are provided on the pivotal plate that prevent the locking elements from returning to the locked position in certain radial alignments of the pivotal plate relative to the guide plate.

12 Claims, 4 Drawing Sheets

U.S. PATENT DOCUMENTS

| | | | |
|---|---|---|---|
| 2004/0084945 A1* | 5/2004 | Toba et al. | 297/367 |
| 2005/0035640 A1* | 2/2005 | Shinozaki | 297/367 |
| 2006/0261657 A1* | 11/2006 | Luo et al. | 297/367 |
| 2007/0145800 A1* | 6/2007 | Thiel et al. | 297/367 |
| 2008/0093907 A1* | 4/2008 | Nag et al. | 297/367 |
| 2008/0197687 A1* | 8/2008 | Luo et al. | 297/367 |
| 2008/0203799 A1* | 8/2008 | Yamada | 297/367 |
| 2009/0085391 A1* | 4/2009 | Peters et al. | 297/367 |

* cited by examiner

HEAVY DUTY RECLINING MECHANISM FOR VEHICLE SEATS

BACKGROUND OF THE INVENTION

1. Field of the Invention

The invention relates to reclining mechanisms for vehicle seating assemblies, more specifically to heavy duty manually operated reclining mechanisms.

2. Background Art

Vehicle seats generally include a seat base and a seat back. Reclining mechanisms for vehicle seats allow the seats to be positioned to accommodate different body types and the personal comfort of seat occupants. Reclining mechanisms for vehicle seats permit the seat back to pivot to allow a passenger to recline or incline the seat.

Manually operated reclining mechanisms establish a locked position in which the seat back does not pivot and an unlocked position in which the seat back can pivot. The mechanism is switched between a locked position and an unlocked position when a user manually operates the reclining mechanism. The mechanism is returned to the normally locked position after the user adjusts the reclining mechanism. Full engagement of the reclining mechanism must be assured in the locked position.

Reclining mechanisms must meet or exceed performance specifications and must be simple for customers to use. Some seat manufacturing specifications have higher load specifications that may require the seat back hinge to withstand more than 4,000 $N_m$ in the event of a collision. The components of prior art reclining mechanisms are not easily assembled into a compact package. The axial thickness of prior art reclining mechanisms in some instances exceeded the space available between the seat base and seat back.

Assembly of the reclining mechanism can be complicated and labor intensive. The need to assemble spring biased parts together may tend to complicate assembly processes because of the need to compress the spring as parts are assembled together in some designs.

The present invention is directed to overcoming the above problems and other problems that are addressed by the embodiments that are summarized below.

SUMMARY OF THE INVENTION

A reclining mechanism for a vehicle seat is provided that has a guide plate adapted to be secured to one of a seat base or a seat back and a pivotal plate adapted to be secured to the other of the seat base or seat back. The pivotal plate is pivotally connected to the guide plate about a pivotal axis. A circular rib on the guide plate defines an axially extending bearing surface that engages an axially extending bearing surface formed on the outer periphery of the pivotal plate. The pivotal plate is provided with internal gear teeth. A cam is provided that is connected to a hub that has a plurality of cam lobes. A plurality of locking elements are moved between a locked position and a disengaged position relative to the guide plate. Guides are integrally formed in the guide plate that guide the movement of the locking elements. The locking elements each have a plurality of gear teeth that extend radially outwardly and are interlocked with the internal gear teeth formed on the pivotal plate. The locking elements each have a cam following engagement surface that includes a plurality of lands that cooperates with the cam lobes to hold the gear teeth of the locking elements in engagement with the internal gear teeth of the pivotal plate. Manual rotation of the hub causes the cam lobes to move out of engagement the lands of the engagement surface of the locking elements. A control plate is attached to the hub through the cam. The control plate has a plurality of slots that each receive an axially extending protrusion, or pin, that is provided on each of the locking elements. The control plate is manually rotated with the cam and positively engages the locking elements to draw them inwardly to disengage the gear teeth from the internal teeth of the pivotal plate. At least two springs are attached to an axially recessed portion of the guide plate that is axially adjacent to two of the locking elements. The springs engage two diametrically opposed, axially extending pins on the cam to normally bias the cam lobes into engagement with the lands of the locking elements in the locked position. The springs provide a balanced and symmetrical spring biasing force to the cam that is applied to the locking elements.

A seat assembly for use in a vehicle is provided with a seat base, a seat back, a pair of reclining mechanisms and a shaft. Each of the reclining mechanisms has a guide plate that is adapted to be secured to the seat base and a pivotal plate that is adapted to be secured to the seat back which is pivotally connected to the guide plate about a pivotal axis. A circular rib on the guide plate defines an axially extending bearing surface that engages an axially extending bearing surface formed on the outer periphery of the pivotal plate. Each pivotal plate is provided with internal gear teeth on an axially extending surface that is located inboard of the outer periphery of the pivotal plate. A hub that receives the shaft is attached to a cam that has a plurality of contact points. Four lock elements are moved by the cam relative to the guide plate between a locked position and an unlocked position. The lock elements each have an external gear segment that faces radially outwardly that are interlocked with the internal gear teeth in the locked position. The cam engages each lock element at two contact points to drive the external gear segments into the internal gear teeth when the pair of reclining mechanisms is in the locked position. The lock elements each have a pin on a first radially extending side that cooperates with a release plate that includes a receptacle for each of the pins. Two springs are provided on a second radially extending side of two of the locking elements that engage the cam at two diametrically opposed locations to urge the cam to move the external gear segments into engagement with the internal gear teeth. The springs are disposed axially adjacent two of the locking elements. The release plate is assembled adjacent to the first radially extending side of the locking elements and is manually rotated to cause the receptacles to draw the pins of the locking elements radially inwardly to the unlocked position. In the unlocked position each of the external gear segments is disengaged from the internal gear teeth and the contact points are disengaged with the locking elements.

According to other aspects of the invention, an arcuate rib may be provided on the pivotal plate that engages the pin, or protrusion, on the opposite side of the release plate from the locking elements and prevents the locking elements from returning to the locked position in certain radial alignments of the pivotal plate relative to the guide plate. This arrangement permits the locking elements to be manually released and held in the released position even after the manual force used to release the locking elements is no longer applied.

According to further aspects of the invention, a clamping ring may be secured to the guide plate with an axially extending circular flange that retains the pivotal plate axially adjacent to the guide plate. The axial position of the guide plate on the hub may be established by a circumferentially extending flange on the hub while the clamping ring locates the pivotal plate axially relative to the guide plate which thereby establishes the axial position of the pivotal plate relative to the hub.

A resilient spacer ring may be provided between the clamping ring and the pivotal plate. A seal may be provided between the hub, the cam and the pivotal plate to provide a seal around the hub.

These and other features of the invention will be better understood in view of the attached drawings and the following detailed description of the illustrated embodiment.

DETAILED DESCRIPTION OF THE ILLUSTRATED EMBODIMENT OF THE INVENTION

An illustrated embodiment of the invention is disclosed below but it is to be understood that the disclosed embodiments are merely examples of the invention that may be embodied in various and alternative forms. The figures are not necessarily to scale and some features may be exaggerated or minimized to show details of particular components. The specific structural and functional details are not to be interpreted as limiting, but merely as a representative embodiment providing support for the claims and are intended to be sufficient to teach one skilled in the art how to practice the invention.

Figure 1:
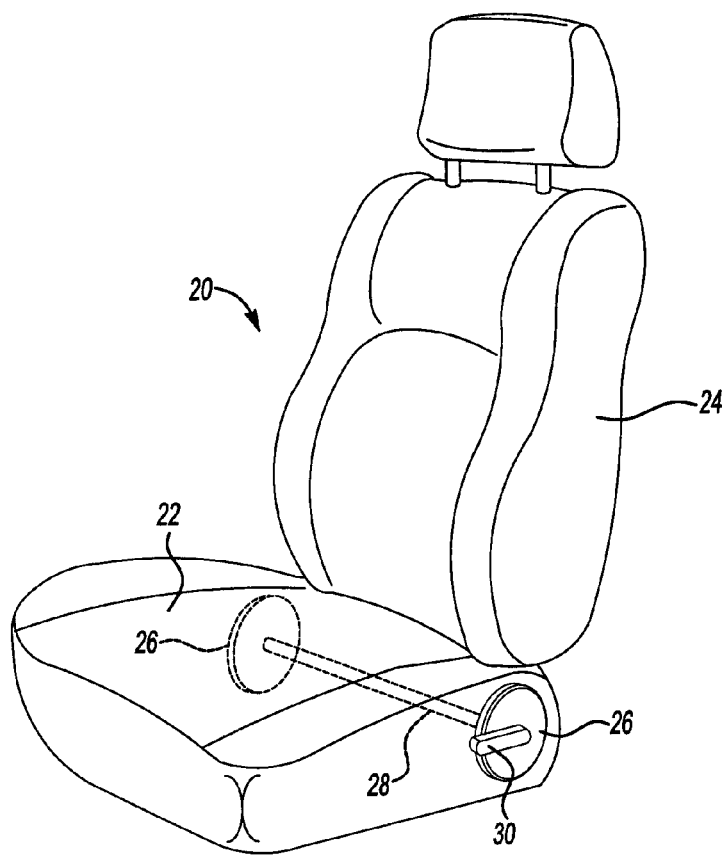
FIG. 1 is a perspective view of a seat assembly that is provided with a manually operated reclining mechanism.

Referring now to FIG. 1, a seat assembly is illustrated and referenced generally by numeral 20. The seat assembly 20 includes a horizontal seat base 22. The seat assembly 20 also includes an upright seat back 24. A pair of reclining mechanisms 26 connect the seat base 22 to the seat back 24. The reclining mechanisms 26 are connected together by a shaft 28. The shaft 28 links the reclining mechanisms 26 to lock or unlock the seat back 24 relative to the seat base 22.

Figure 2:
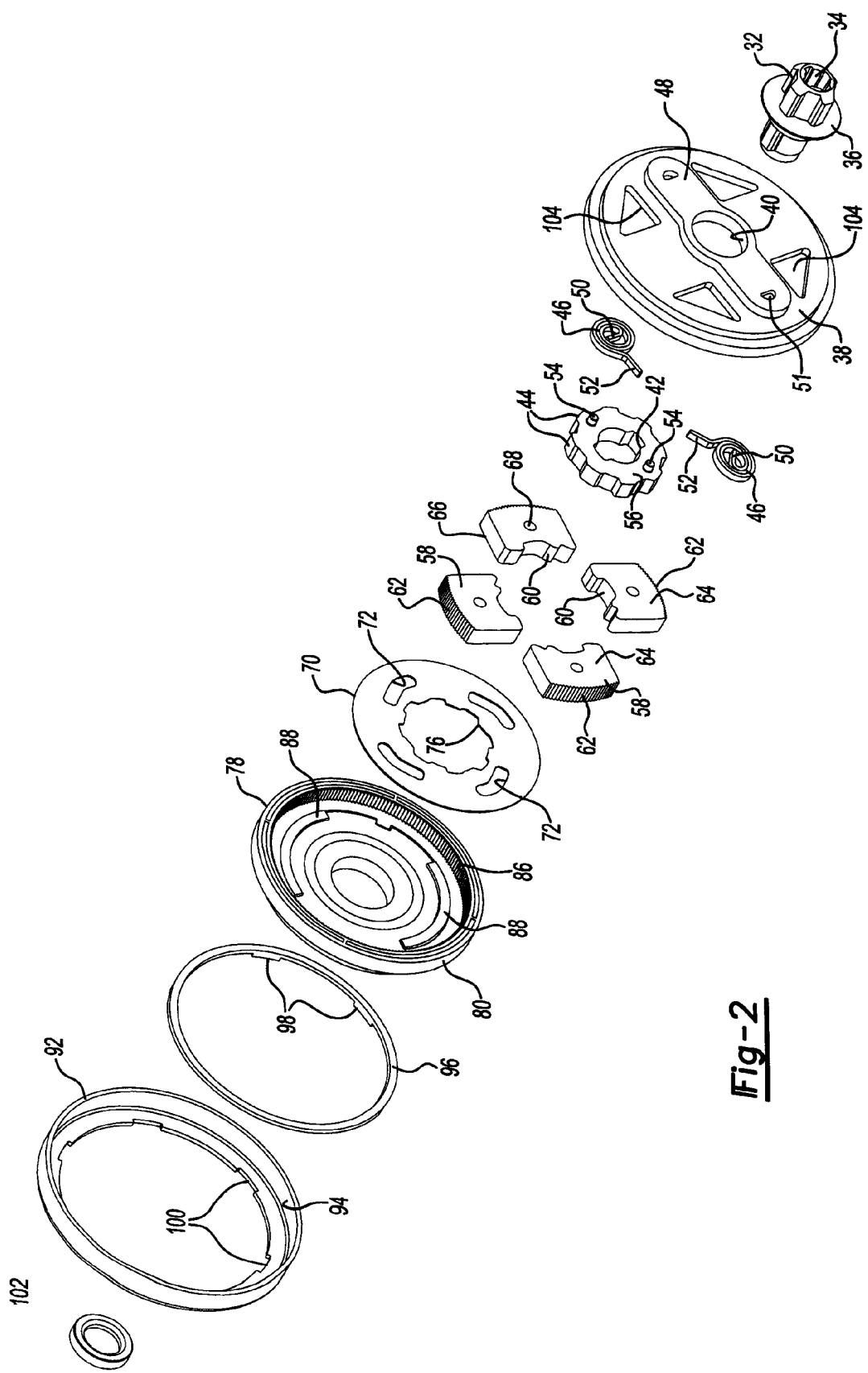
FIG. 2 is an inside exploded perspective view of a manually operated reclining mechanism made according to one embodiment of the present invention.
Figure 3:
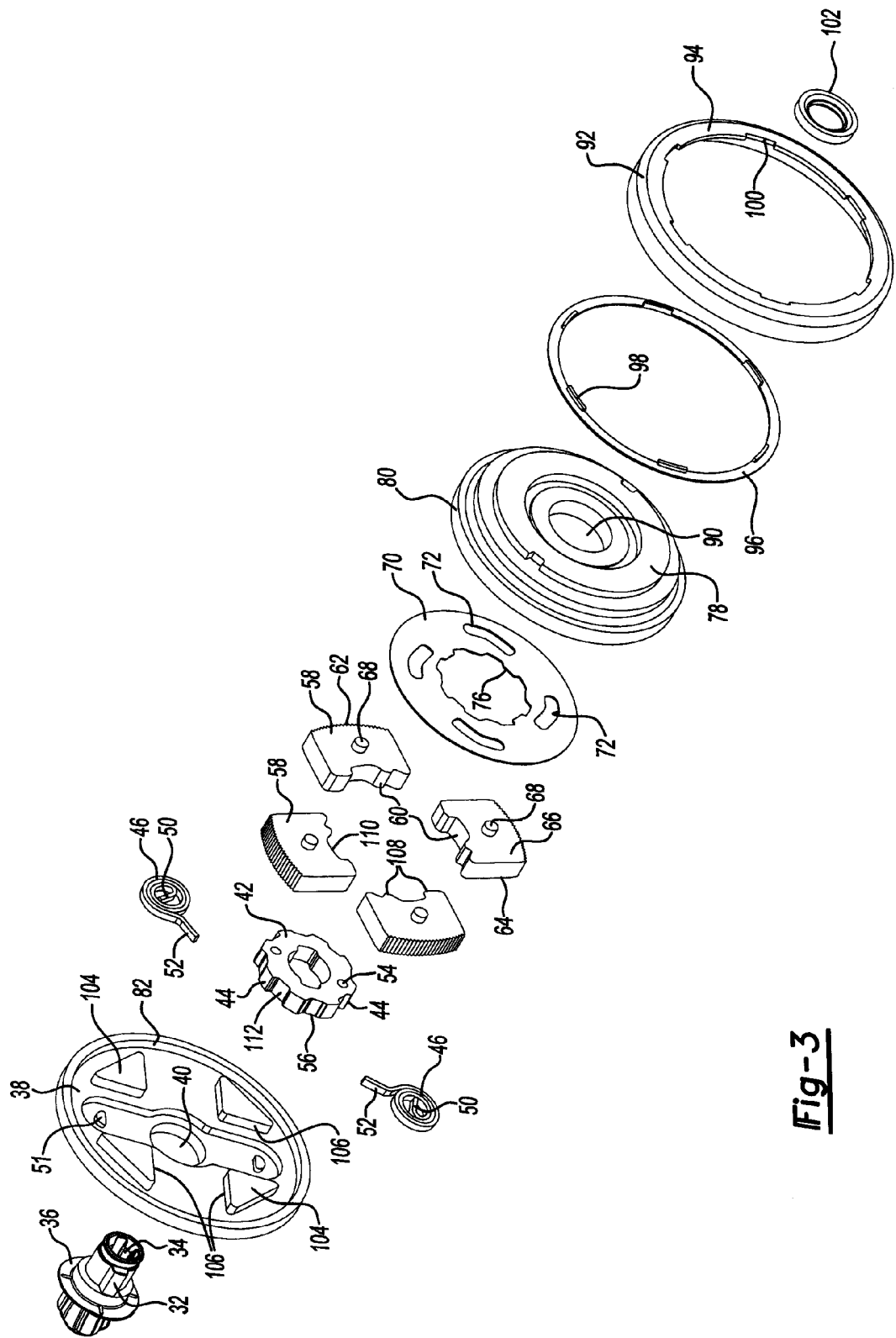
FIG. 3 is an outside exploded perspective view of the manually operated reclining mechanism made according to one embodiment of the present invention.

Referring to FIGS. 2 and 3, the structure of one of the reclining mechanisms 26 is shown in greater detail. A hub 32 is adapted to be connected to the shaft 28 (shown in FIG. 1). The hub 32 includes a splined hole 34 in which the shaft 28 is received. The hub 32 includes a radial flange 36 that is assembled against a guide plate 38. The hub 32 is received in a central opening 40 formed in the guide plate 38.

A cam 42 is assembled to the hub 32 so as to rotate with the hub 32. The cam 42 includes a plurality of cam lobes 44. In the illustrated embodiment, eight cam lobes 44 are provided around the periphery of the cam 42. A pair of springs 46 are assembled into an elongated cavity 48 of the guide plate 38. An inner anchoring end 50 of the springs 46 is secured to a spring anchor 51. The springs 46 include a radially extending engagement end 52 that engages a pin 54 that is secured to the guide plate side, or inner side, 56 of the cam 42.

A plurality of locking elements 58 are assembled around the cam 42. The locking elements 58 in the illustrated embodiment comprise four locking elements 58 with two locking elements being located axially adjacent to the two springs 46. The locking elements 58 include a cam following edge 60 that cooperates with the cam lobes 44 to permit the locking elements 58 to move in a radial direction between a locking position and an unlocking position as will be more fully described below. Each of the locking elements 58 includes an externally toothed edge 62 that is radially outwardly oriented. The locking elements 58 have an inner side 64 that is generally smooth and is adapted to slide relative to the guide plate 38. An outer side 66 of the locking elements 58 is provided with a pin 68.

A control plate 70 is assembled axially onto the outer side 66 of the locking elements 58. The control plate 70 has a plurality of slots 72 that each receive one of the pins 68 that is provided on the outer side 66 of the locking elements 58. A cam receiving opening 76 is provided in the control plate 70 in which the cam 42 is received so that as the cam 42 is rotated, the control plate 70 rotates with the hub 32 and the cam 42.

A pivot plate 78 includes an outer periphery bearing surface 80 that guides the pivoting movement of the pivot plate 78 relative to the guide plate 38. The guide plate 38 has an axially extending bearing surface 82 against which the outer periphery bearing surface 80 is adapted to slide. Internal teeth 86 are provided on the pivot plate 78 that extend radially inwardly and are engaged by the externally toothed edge 62 of the locking elements 58. Disengagement ribs 88 are provided on the pivot plate 78 to hold the pins 68 of the locking elements 58 to hold the locking elements 58 in an unlocked position during certain portions of the pivotal movement of the pivot plate 78 relative to the guide plate 38. The pivot plate 78 has a central opening 90 in which the end of the hub 32 is received when the reclining mechanism 26 is assembled.

An outer case 92 is welded to the guide plate 38. The outer case 92 has a radial flange 94 that extends radially toward the guide plate 38. A spacer ring 96 is provided between the outer case 92 and the pivot plate 78. The spacer ring 96 is preferably formed of a smooth polymeric material. The spacer ring 96 has a plurality of arcuate tabs 98 that are received in arcuate slots 100 formed in the outer case 92. A seal 102 is secured between the hub and the central opening 90 of the pivot plate 78. A plurality of guide blocks 104 are provided on the guide plate 38. The guide blocks 104 guide the movement of the locking elements 58. Guide ways 106 are provided on the sides of the guide blocks 104 that guide the locking elements 58 between their locked and unlocked positions.

Figure 4:
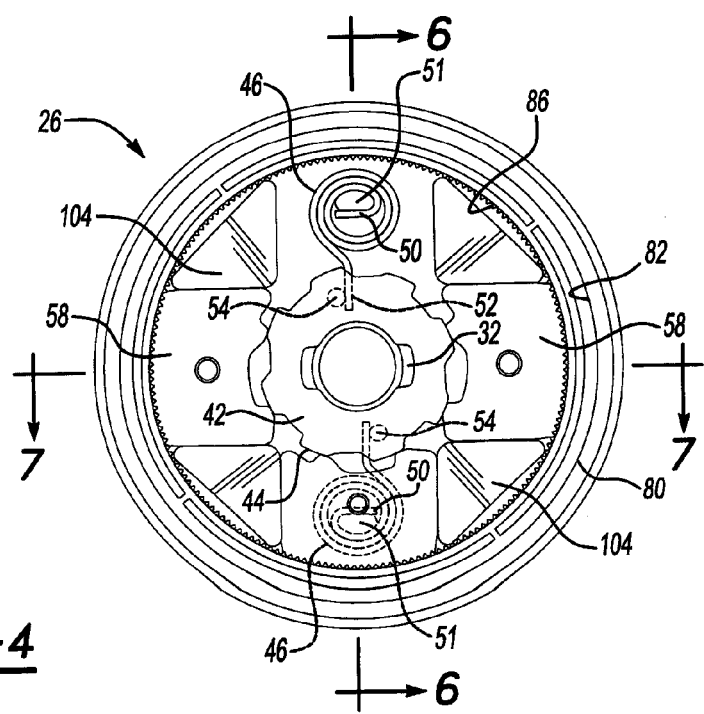
FIG. 4 is an elevation view of the reclining mechanism made according to one embodiment of the present invention partially assembled to show the cam and locking elements in a locked position.

Referring to FIG. 4, lands 108 are provided on the locking elements 58 that are separated by recesses 110. The lands 108 and recesses 110 make up the cam following edge 60 of the locking elements 58. As shown in FIG. 4, one of the locking elements is removed to show one of the springs while the other three locking elements 58 are in their locked position with the cam lobes 44 of the cam 42 engaging the lands 108 of the locking elements 58. When the reclining mechanism 26 is shifted to its unlocked position, the cam lobes 44 of the cam 42 are received in the recesses 110 between the lands 108. In the unlocked position (shown in FIG. 5), the locking elements 58 are shifted radially inwardly so that the externally toothed edge 62 of the locking elements 58 disengage the internal teeth 86 formed on the pivot plate 78. In FIG. 4, the springs 46 are shown secured to the spring anchors 51 with their radially extending engagement ends 52 engaging the pins 54 on the cam 42. The springs 46 bias the cam 42 in a counter-clockwise direction as viewed in FIG. 4 to hold the locking elements 58 in their locked position. Recessed areas 112 are provided between the cam lobes 44 that receive the lands 108 of the locking elements 58 when the reclining mechanism 26 is in its unlocked position.

Figure 5:
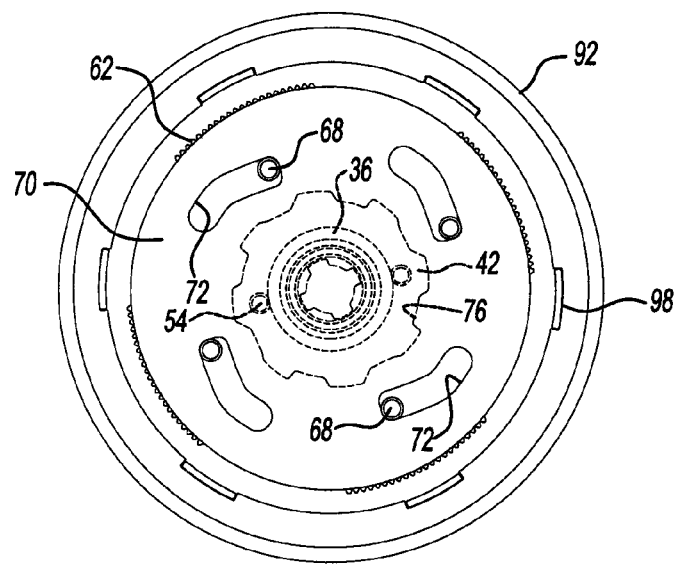
FIG. 5 is an elevation view of the reclining mechanism made according to one embodiment of the present invention partially assembled to show the cam and locking elements in an unlocked position.

Referring to FIG. 5, the control plate 70 is shown with the pins 68 on the locking elements 58 being drawn inwardly by the rotation of the cam 42 and the control plate 70. In this position, the externally toothed edges 62 of the locking elements 58 are disengaged from the internal teeth 86 of the pivot plate 78. When the manual force applied by the handle 30 to the hub 32 is released, the pins 68 move to the opposite ends of the slot 72 allowing the locking elements 58 to move back to their locked position with the externally toothed edges 62 engaging the internal teeth 86 of the pivot plate 78.

Figures 6, 7:
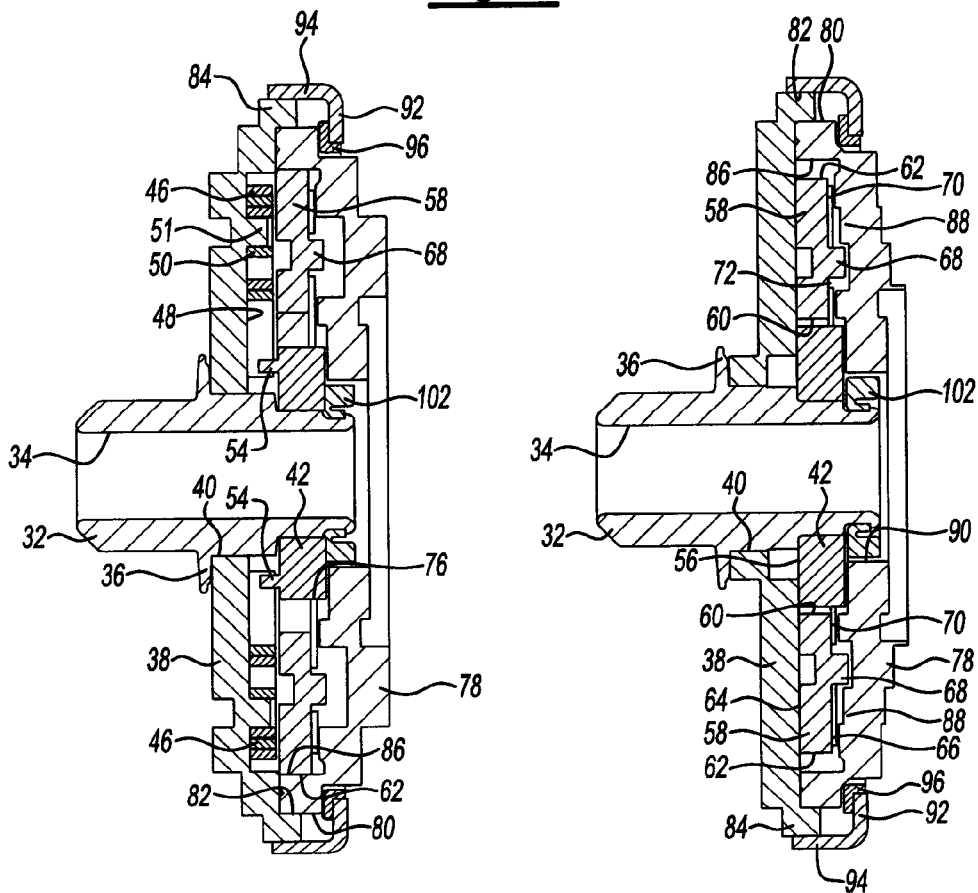
FIG. 6 is a cross-sectional view of the reclining mechanism made according to one embodiment of the present invention taken along the line 6-6 in FIG. 4.
FIG. 7 is a cross-sectional view of the reclining mechanism made according to one embodiment of the present invention taken along the line 7-7 in FIG. 4.

Referring to FIG. 6, the structure of the reclining mechanism 26 is shown in cross-section. As shown in FIG. 6, the locking elements 58 are in their locked position with the externally toothed edge 62 in engagement with the internal teeth 86 of the pivot plate 78.

The hub 32 is assembled to the guide plate 38 with the radial flange 36 axially adjacent the guide plate 38. The guide plate is joined to the outer case 92 on its outer periphery. The outer periphery bearing surface 80 of the pivot plate 78 engages the axially extending bearing surface 82 of the guide plate 38. The guide plate 38 and spacer ring 96 are held in axial assembly with the guide plate 38 by the outer case 92. The cam 42 is assembled to the hub 32 and the seal 102 is assembled over the end of the hub 32 to form a seal between the hub 32, cam 42 and central opening 90 in the pivot plate 78.

Referring to FIG. 7, a section is taken through the locking elements that are not axially adjacent the springs 46. The disengagement ribs 88 (shown in FIGS. 2 and 7) are integrally formed in the pivot plate 78 and engage the pin 68 of the locking elements 58 during a certain portion of the pivotal rotation of the control plate 70 and cam 42. The disengagement ribs 88 hold the two locking elements 58 in their unlocked position by engaging the pin 68. The other two locking elements 58 are held in by operation of the slots 72 in the control plate 70.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A reclining mechanism for a vehicle seat comprising:
    a guide plate secured to one of a seat base or a seat back;
    a pivotal plate secured to the other of the seat base or seat back and that is pivotally connected to the guide plate about a pivotal axis, the pivotal plate has a plurality of internal gear teeth;
    a cam having a plurality of cam lobes is pivotally disposed on a hub between the guide plate and the pivotal plate;
    a plurality of locking elements cooperate with the guide plate and the cam and are moved relative to the guide plate, the locking elements each have an external gear segment that extend radially outwardly and cooperate with the internal gear teeth, the locking elements each have a cam following engagement surface that has a plurality of lands that cooperate with the cam lobes, wherein rotation of the cam causes the cam lobes to engage the cam following engagement surfaces of the locking elements to hold the external gear segments of the locking elements in engagement with the internal gear teeth in a locked position;
    a control plate is secured to the hub and is manually rotated by the hub, the control plate has a plurality of slots that each receive an axially extending protrusion that is provided on one of the locking elements to draw the locking elements radially inwardly to disengage the external gear segments from the internal gear teeth of the pivotal plate in an unlocked position;
    at least two springs are attached to the guide plate at spaced locations relative to the axis and engage the cam to normally bias the cam pivotally to drive the external gear segments into engagement with the internal gear teeth, the springs are disposed in an axially recessed portion of the guide plate and are enclosed between the guide plate and the pivot plate;
    wherein the cam engages each locking element to drive the external gear segments into the internal gear segments when the reclining mechanism is in the locked position; and
    wherein an arcuate rib is provided on the pivotal plate that engages the axially extending protrusions on the locking elements, wherein the rib prevents the locking elements from returning to the locked position in certain radial alignments of the pivotal plate relative to the guide plate.

2. The reclining mechanism of claim 1 wherein the rib permits the locking elements to be manually released and held in the released position after the manual force is no longer applied.

3. The reclining mechanism of claim 1 wherein a clamping ring is secured to the guide plate, the clamping ring having an axially extending flange that retains the pivotal plate axially adjacent to the guide plate.

4. The reclining mechanism of claim 3 further comprising a resilient spacer ring disposed between the clamping ring and the pivotal plate.

5. The reclining mechanism of claim 4 wherein the clamping ring locates the pivotal plate axially relative to the guide plate and thereby establishes the axial position of the pivotal plate relative to the hub.

6. The reclining mechanism of claim 1 wherein a circumferential flange on the hub establishes the axial position of the guide plate on the hub.

7. A seat assembly for use in a vehicle comprising:
    a seat base;
    a seat back;
    a pair of reclining mechanisms each including:
        a guide plate secured to one of seat base or seat back;
        a pivotal plate secured to the other of the seat base or seat back, the pivotal plate being pivotally connected to the guide plate about a pivotal axis, the pivotal plate having radially inwardly facing gear teeth;
        a cam has a plurality of cam lobes and is pivotally disposed between the guide plate and the pivotal plate;
        four locking elements cooperate with the guide plate and the cam for radial sliding relative to the guide plate, the locking elements each have external gear teeth that face radially outwardly to cooperate with one of the inwardly facing gear teeth, wherein the cam engages each locking element to drive the external gear teeth into the internal gear teeth when the pair of reclining mechanisms is in a locked position, the locking elements each have a plurality of lands that cooperate with the cam lobes, wherein rotation of the cam causes the cam lobes to engage one of the lands to drive the locking elements radially outwardly which engages the external gear teeth with the internal gear teeth, each locking element has a pin on a first radially extending side;

two springs are attached to a second axially extending side of the guide plate and are disposed axially adjacent two of the locking elements, the two springs bias the cam pivotally to drive the external gear segments into engagement with the internal gear segments;

a release plate includes a plurality of receptacles that each receive one of the pins provided on the locking elements;

a shaft is connected to a hub on opposite ends each to one of the pair of reclining mechanisms, the shaft engages the hubs of the pair of reclining mechanisms to force cooperation between the pair of reclining mechanisms;

wherein the shaft is manually rotated to rotate each of the hubs which causes the release plate to rotate, rotation of the release plate causes the pins to pull each of the locking elements radially inwardly to unlock each of the pivotal plates relative to the guide plates thereby allowing the seat back to be reclined or inclined relative to the seat base; and wherein an arcuate rib is provided on the pivotal plate that engages the pins on the locking elements, wherein the rib prevents the locking elements from returning to the locked position in certain radial alignments of the pivotal plate relative to the guide plate.

8. The seat assembly of claim 7 wherein the rib permits the locking elements to be manually released and held in the released position after the manual force is no longer applied.

9. The seat assembly of claim 7 wherein a clamping ring is secured to the guide plate, the clamping ring having an axially extending flange that retains the pivotal plate axially adjacent to the guide plate.

10. The seat assembly of claim 9 further comprising a resilient spacer ring disposed between the clamping ring and the pivotal plate.

11. The seat assembly of claim 7 wherein a circumferential flange on the hub establishes the axial position of the guide plate on the hub.

12. The seat assembly of claim 11 wherein the clamping ring locates the pivotal plate axially relative to the guide plate and thereby establishes the axial position of the pivotal plate relative to the hub.

* * * * *